UNITED STATES PATENT OFFICE.

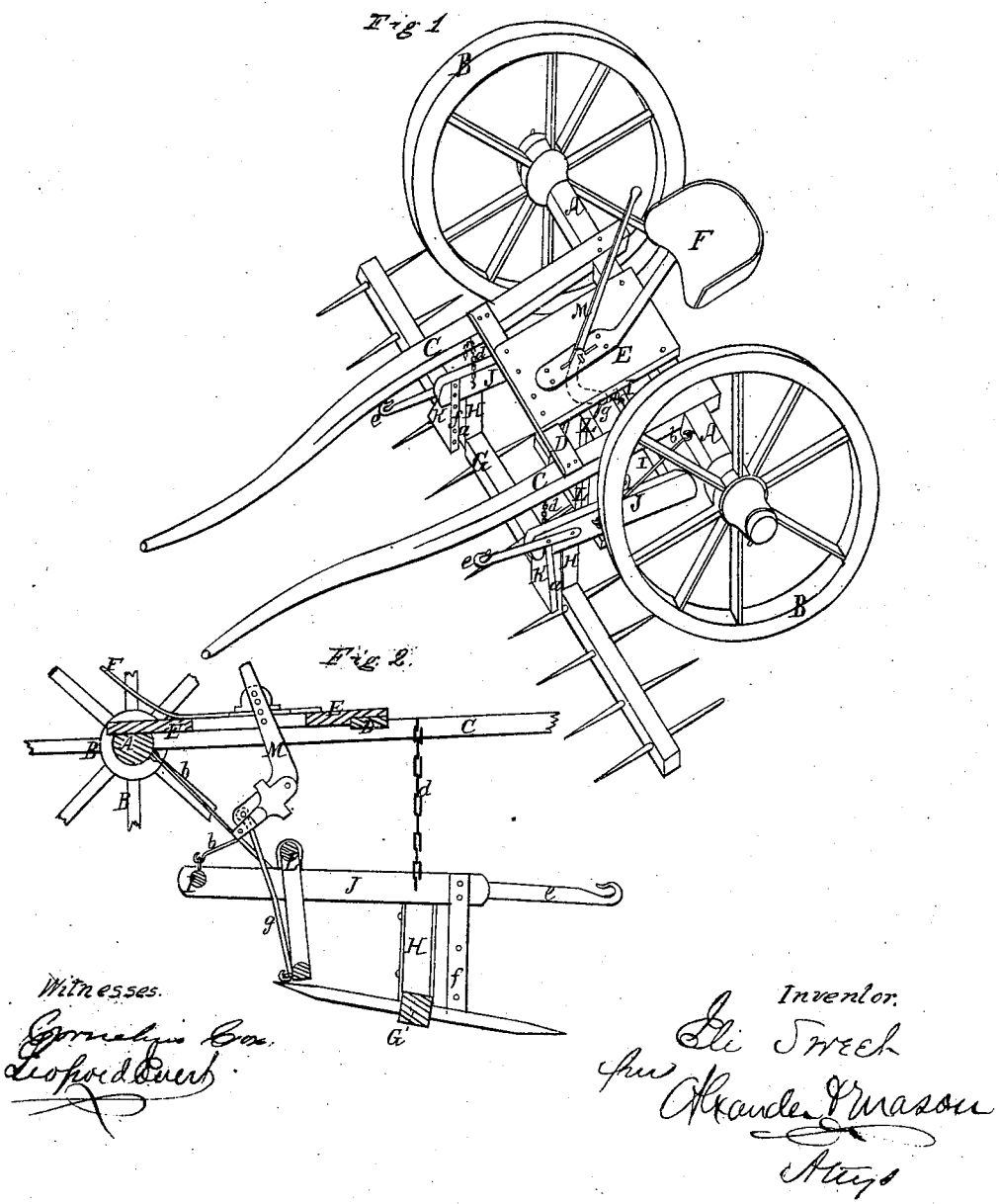

ELI SWEET, OF TRIANGLE, NEW YORK, ASSIGNOR TO GEORGE T. GUIER.

Letters Patent No. 85,872, dated January 12, 1869.

IMPROVEMENT IN HORSE-RAKES.

The Schedule referred to in these Letters Patent and making part of the same.

*To all whom it may concern:*

Be it known that I, ELI SWEET, of Triangle, in the county of Broome, and in the State of New York, have invented certain new and useful Improvements in "Horse Hay-Rakes;" and do hereby declare that the following is a full, clear, and exact description thereof, reference being had to the accompanying drawings, and to the letters of reference marked thereon.

The nature of my invention consists in the construction and general arrangement of a horse hay-rake, which will be hereinafter more fully set forth.

In order to enable others skilled in the art to which my invention appertains, to make and use the same, I will now proceed to describe its construction and operation, referring to the annexed drawings, which form a part of this specification, and which represent a perspective view of the rake.

A represents the axle, to which the wheels B B are attached.

The shafts C C are secured at suitable points on the axle A, and they are further braced and strengthened by a cross-bar, D.

A platform, E, rests on the said cross-bar and on the axle, and on this platform the driver's seat F is suitably secured.

The rake G consists of a bar, with a series of teeth passed through the same, and extending on both sides of said bar, both ends of the teeth being pointed.

The rake is suspended from two blocks, H H, by means of stirrups *a a*, which pass around the rake-bar, said bar being rounded, for that purpose, at the points where the said stirrups are placed, thus allowing the rake to revolve with ease.

The blocks H H are secured to the lower side of two arms, J J, which, at their rear ends, are connected by means of a cross-bar, I, thus forming a frame, with the rake at the front end.

This frame is suspended by means of rods *b b*, which are hooked to the axle A and to the arms J J, and, near the front ends of said arms, they are suspended from the shafts C C by means of chains *d d*, thus enabling the operator to raise the rake entirely above the ground when moving from one field to another, turning, &c.

To the front ends of the arms J J are secured hooks *e e*, to which the horse is hitched, thus bringing the draught to bear directly on the rake.

On the inner side of the front ends of the arms J J are secured springs *f f*.

These springs are provided on their outer sides with wedge-shaped blocks K K. When the rake G revolves, two of the teeth on the front side slide on the outer inclined side of said blocks. The springs *f f*, giving way, allow the rake to fall in proper position to catch the hay, the edges of the said blocks preventing the rake to from turning backward.

For the purpose of dumping the rake, I place a small frame, L, pivoted in the arms J J.

This frame is connected, by a rod, *g*, to a lever, M, which extends up through the platform E, being in some suitable manner pivoted to the same, so as to be within easy reach of the operator on the seat F.

It will be seen that, by operating the lever M, the lower end of the frame L will catch underneath the rear teeth of the rake, lifting the same up, and thus turning the rake, and depositing the hay raked together at any place desired.

The lever M is also connected by a rod, *h*, to the cross-bar I, so that, at the same time as the rake is revolved or turned, the rear end of the frame I J is lifted up, thus facilitating the dumping-process.

Having thus fully described my invention,

What I claim as new, and desire to secure by Letters Patent, is—

1. The arrangement of the platform E, lever M, rods *g* and *h*, and frame L, all substantially as shown and described.

2. The arrangement of the arms J J, cross-bar I, rods *b b*, and axle-tree A, all substantially as shown and described.

3. The combination of the rake G with platform E, lever M, rods *g h*, and frame L, with the arms J J, blocks H H and K K, and hooks *e e*, all substantially as and for the purposes set forth.

In testimony that I claim the foregoing, I have hereunto set my hand, this 9th day of October, 1868.

ELI SWEET.

Witnesses:
J. T. STODDARD,
D. CHURCH.